United States Patent
McCracken, Jr. et al.

(10) Patent No.: US 10,867,457 B1
(45) Date of Patent: Dec. 15, 2020

(54) PHARMACEUTICAL TRANSPORT SYSTEM INCLUDING ELECTRONIC LOCK BASED PHARMACEUTICAL TRANSPORT CONTAINER AND RELATED METHODS

(71) Applicant: INMAR Rx SOLUTIONS, INC., Ft. Worth, TX (US)

(72) Inventors: James W. McCracken, Jr., Winston Salem, NC (US); Brian Rogers, Greensboro, NC (US); Michael Snellenburg, Winston Salem, NC (US)

(73) Assignee: INMAR RX SOLUTIONS, INC., Ft. Worth, TX (US)

( * ) Notice: Subject to any disclaimer, the term of this patent is extended or adjusted under 35 U.S.C. 154(b) by 8 days.

(21) Appl. No.: 16/180,718

(22) Filed: Nov. 5, 2018

(51) Int. Cl.
  *G07C 9/00* (2020.01)
  *G06K 7/14* (2006.01)
  *H04L 29/06* (2006.01)

(52) U.S. Cl.
  CPC ....... *G07C 9/00182* (2013.01); *G06K 7/1413* (2013.01); *H04L 63/10* (2013.01); *G07C 2009/00253* (2013.01)

(58) Field of Classification Search
  CPC ................. H04L 63/1433; H04L 63/0263
  See application file for complete search history.

(56) References Cited

U.S. PATENT DOCUMENTS

| | | | | |
|---|---|---|---|---|
| 8,267,622 B1* | 9/2012 | MacLean-Blevins | | B65G 51/06 406/186 |
| 8,601,776 B2* | 12/2013 | Henkel | | G07F 11/46 53/500 |
| 9,592,969 B2 | 3/2017 | Wolfe et al. | | |
| 9,611,105 B1* | 4/2017 | Powder | | B65G 51/42 |
| 10,097,353 B1* | 10/2018 | Carlson | | H04W 12/0608 |
| 10,373,226 B1* | 8/2019 | Russell | | G06Q 30/0613 |
| 2006/0028727 A1* | 2/2006 | Moon | | G06K 19/06009 359/569 |
| 2013/0335193 A1 | 12/2013 | Hanson et al. | | |
| 2014/0048593 A1* | 2/2014 | Hoganson | | G06Q 10/06316 235/376 |
| 2014/0330428 A1* | 11/2014 | Wolfe | | B65G 51/44 700/226 |
| 2015/0078137 A1* | 3/2015 | Lee | | G08C 23/02 367/198 |
| 2015/0145647 A1* | 5/2015 | Engel-Dahan | | G07C 9/28 340/5.61 |
| 2016/0096691 A1* | 4/2016 | Gross | | B65G 51/26 406/3 |
| 2018/0300733 A1* | 10/2018 | Duca | | B41J 2/17509 |
| 2019/0298926 A1* | 10/2019 | Cowe | | A61M 5/31596 |
| 2019/0378085 A1* | 12/2019 | Sipes | | G06Q 10/0833 |

* cited by examiner

*Primary Examiner* — Ali Shayanfar
(74) *Attorney, Agent, or Firm* — Allen, Dyer, Doppelt + Gilchrist, P.A. Attorneys at Law

(57) ABSTRACT

A pharmaceutical transport system may include a pneumatic tube network and a pharmaceutical transport container movable within the pneumatic tube network. The pharmaceutical transport container may include a tubular container having open and closed positions for receiving at least one pharmaceutical therein, and an electronic lock securing the tubular container in the closed position and opening based upon a match between an entered digital code and a current changing digital code.

19 Claims, 10 Drawing Sheets

PHARMACEUTICAL TRANSPORT SYSTEM INCLUDING ELECTRONIC LOCK BASED PHARMACEUTICAL TRANSPORT CONTAINER AND RELATED METHODS

TECHNICAL FIELD

The present invention relates to the field of pneumatic transport systems, and more particularly, to containers for pneumatic transport systems and related methods.

BACKGROUND

A pneumatic transport system is a system that propels containers, typically cylindrical in shape, through networks of tubes by compressed air or by partial vacuum. Solid objects may be placed in a container and transported relatively easily through a pneumatic transport system.

One implementation for a pneumatic transport system may be in health care. For example, a hospital may have a pneumatic transport system to distribute pharmaceuticals. In some instances, for example, where controlled pharmaceuticals are distributed, the system may include one or more security features to restrict access to the controlled pharmaceuticals. For example, a lock may be used to restrict access to within the container.

U.S. Patent Application Publication No. 2014/0330428 to Wolfe et al. discloses a carrier or container for use within a pneumatic transport system. The carrier has a generally cylindrical shape and is a two-part carrier, that is, it is hinged on one side, e.g., in a clamshell configuration, so that it may be opened and closed to insert and remove items to be delivered. The carrier includes a barcode identifier, which identifies the particular carrier. The carrier also includes a mechanical lock configured so that when the carrier is closed, a latching mechanism engages a female element to lock the carrier. To unlock the carrier, a user inputs an appropriate 3-digit code to disengage the latching mechanism from the female element and open the carrier.

SUMMARY

A pharmaceutical transport system may include a pneumatic tube network and a pharmaceutical transport container movable within the pneumatic tube network. The pharmaceutical transport container may include a tubular container having open and closed positions for receiving at least one pharmaceutical therein, and an electronic lock securing the tubular container in the closed position and opening based upon a match between an entered digital code and a current changing digital code.

The electronic lock may include a manual code input device to permit manual entry of the digital code. The electronic lock may include a wireless receiver to permit wireless entry of the digital code, for example. The electronic lock may include a camera to permit optical entry of the digital code.

The pharmaceutical transport system may further include an authorization server configured to send the current changing digital code to the electronic lock, for example. The pharmaceutical transport system may also include an authorization server configured to send the current changing digital code to a user device.

The current changing digital code may include a rolling code, for example. The electronic lock may include a processor and associated memory, and an electromechanical actuator coupled to the processor.

The tubular container may include a tubular body, and a pair of movable end caps coupled to respective ends of the tubular body. The electronic lock may secure at least one of the tubular end caps to the tubular body, for example. The tubular body may include a pair of mating container sections, for example.

A method aspect is directed to a method of providing at least one pharmaceutical in a pharmaceutical container movable within a pneumatic tube network of a pharmaceutical transport system. The method may include operating an electronic lock securing a tubular container, having open and closed positions for receiving at least one pharmaceutical therein, between the closed position and the open position based upon a match between an entered digital code and a current changing digital code.

DETAILED DESCRIPTION

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout, and prime and multiple prime notation is used to indicate similar elements in alternative embodiments.

Figure 1:
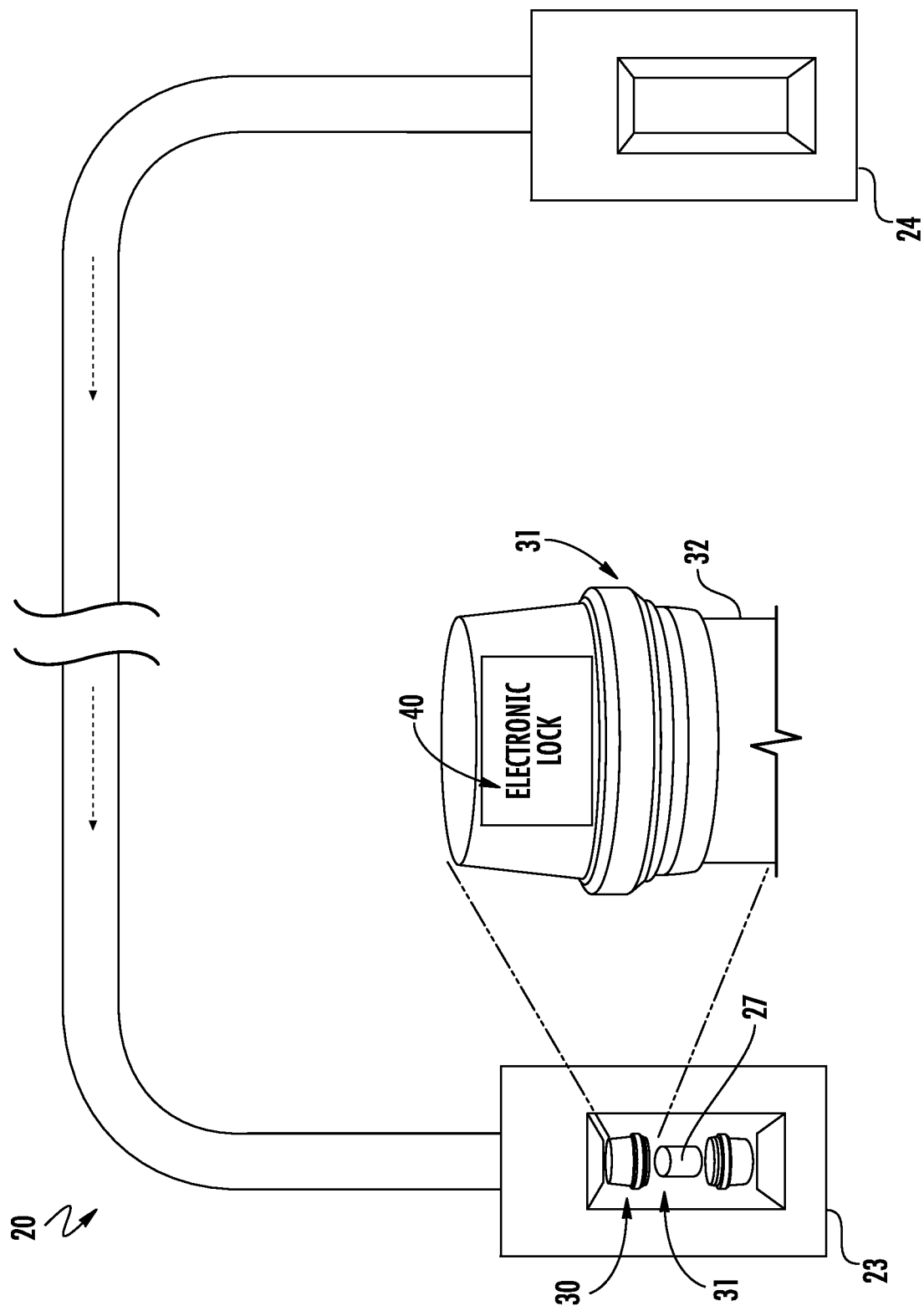
FIG. 1 is a schematic diagram of a pharmaceutical transport system in accordance with an embodiment.
Figure 2:
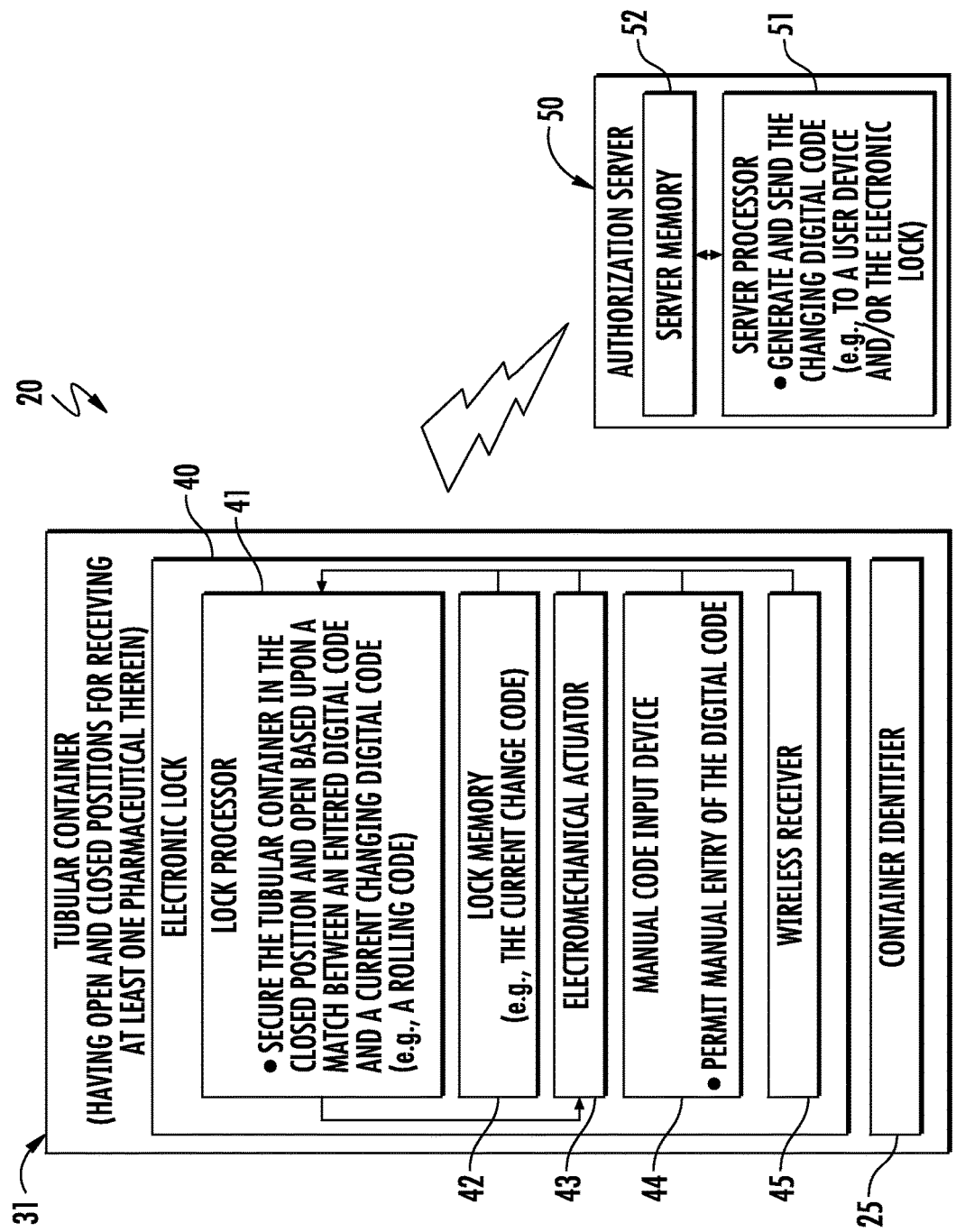
FIG. 2 is a more detailed schematic diagram of the pharmaceutical transport system of FIG. 1.
Figure 3:
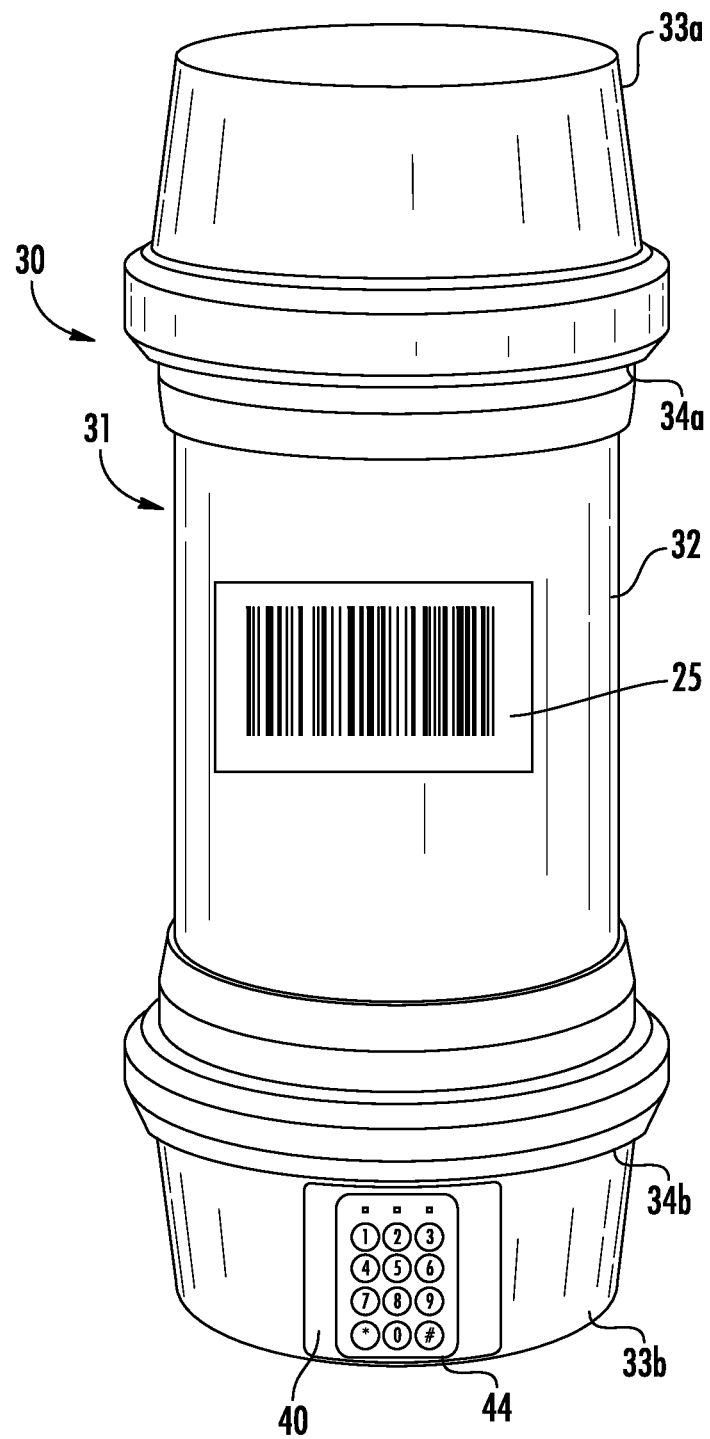
FIG. 3 is a more detailed schematic diagram of the pharmaceutical transport container of FIG. 1.

Referring initially to FIGS. 1-3, a pharmaceutical transport system 20 includes a pneumatic tube network 21. More particularly, the pneumatic tube network 21 includes at least one tube 22 to permit the transport of pharmaceuticals 27 between endpoints 23, 24 based upon the movement of air, for example, from a blower. The pneumatic tube network 21 may extend throughout a facility, for example, a hospital, to permit transport of the pharmaceuticals throughout the hospital, for example, from a pharmacy to another part of the hospital.

The pharmaceutical transport system 20 also includes a pharmaceutical transport container 30 that is movable within the pneumatic tube network 21. For example, the pharmaceuticals 27 are typically transported through the pneumatic tube network 21 within the pharmaceutical transport container 30. The pharmaceutical transport container 30 includes a tubular container 31 having open and closed positions for receiving at least one pharmaceutical 27 therein. While a pharmaceutical is described herein, it should be appreciated by those skilled in that art that a pharmaceutical may include prescription and non-prescription medication, controlled substances, and/or controlled medical devices.

The tubular container 31 includes a tubular body 32 and a pair of movable end caps 33a, 33b coupled to respective ends 34a, 34b of the tubular body. While the movable end caps 33a, 33b are illustratively hingedly coupled to the tubular body 32, those skilled in the art will appreciate that one or both of the end caps 33a, 33b may be removable.

A container identifier 25 may be carried by the tubular container 31. For example, the container identifier 25 may be a barcode, quick-response (QR) code or other identifying code. While a physical container identifier 25 is described, those skilled in the art will appreciate that the container identifier may be in the form of wireless codes or near field communication (NFC) codes, or other type of credential.

The pharmaceutical transport container 30 also includes an electronic lock 40 securing the tubular container 31 in the closed position. More particularly, the electronic lock 40 secures the tubular end caps 33a, 33b to the tubular body 32 in the closed position. The electronic lock 40 opens based upon a match between an entered digital code and a current changing digital code, for example, a rolling code, as will be explained in further detail below.

The electronic lock 40 includes a lock processor 41 and an associated lock memory 42, for example, for storing the rolling or changing digital code (e.g. a reference code to be matched against). An electromechanical actuator 43 is coupled to the lock processor 41. A manual code input device 44 (e.g., a keypad) is also coupled to the lock processor 41 and permits manual entry of the digital code. While one electronic lock 40 is illustrated, those skilled in the art will appreciate that the electronic lock may include more than one electromagnetic actuator 43, for example, corresponding to each of the tubular end caps 33a, 33b (e.g., and with a shared processor 41). Of course, other elements of the electronic lock 40 may be shared or there may be two or more physically separated electronic locks.

The electronic lock 40 may also include, a wireless receiver 45 coupled to the lock processor 41 and that permits wireless entry of the digital code. The wireless receiver 45 may be an alternative to the manual code input device 44 or may be used in conjunction with the manual code input device. In some embodiments, the digital code may be entered either manually or wirelessly.

An authorization server 50, that includes a server processor 51 and associated memory 52 may generate and send the current changing code to the electronic lock 40, for example, for reference or for matching against. The authorization server 50 may also communicate the digital code as will be described in further detail below. While operations of the electronic lock 40 and authorization server 50 are described herein, it will be appreciated by those skilled in the art that the operations are performed based upon cooperation between the respective processors 41, 51 and respective memories 42, 52.

Figure 4:
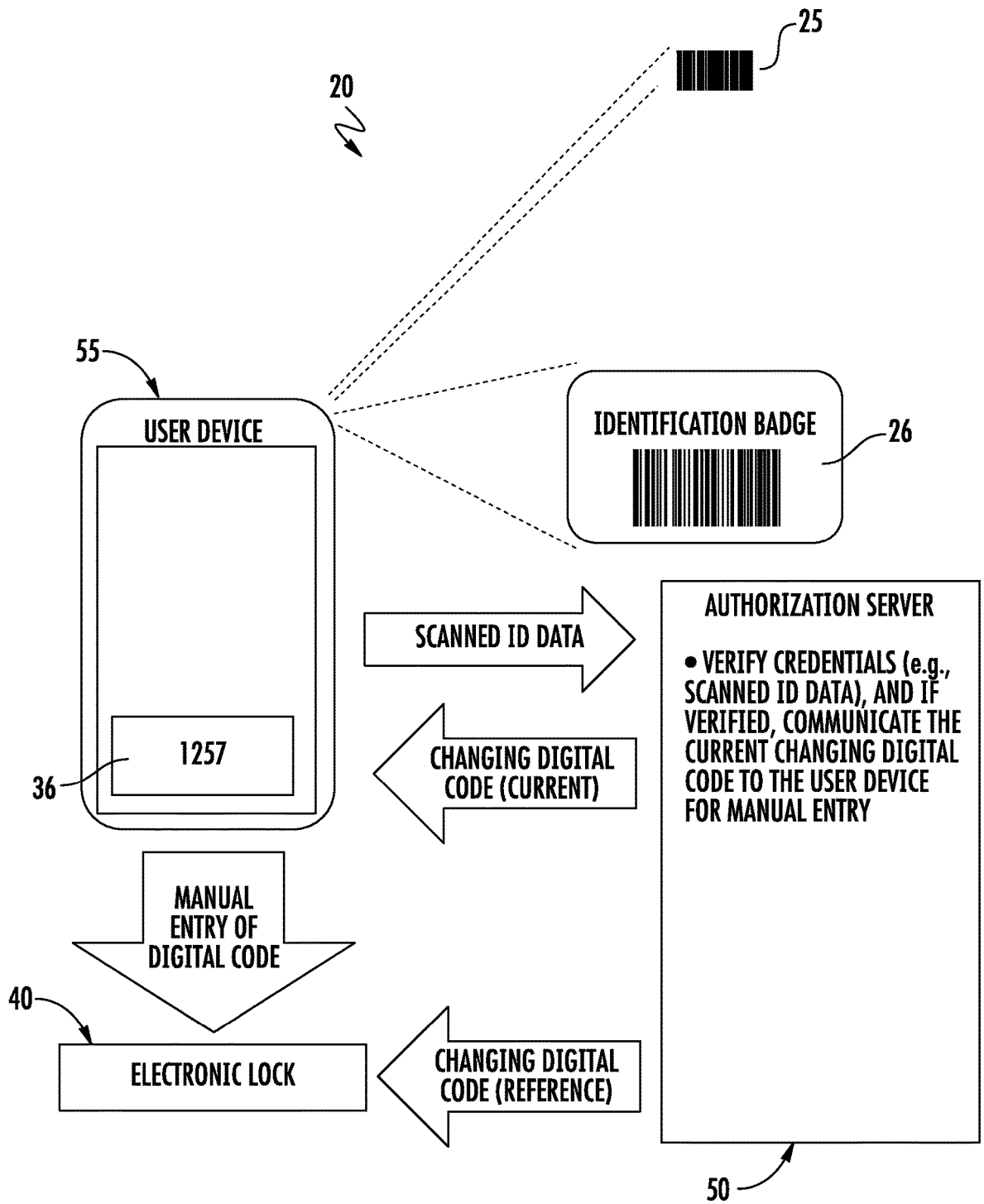
FIG. 4 is a schematic operational diagram of an exemplary implementation of the system of FIG. 1.
Figure 5:
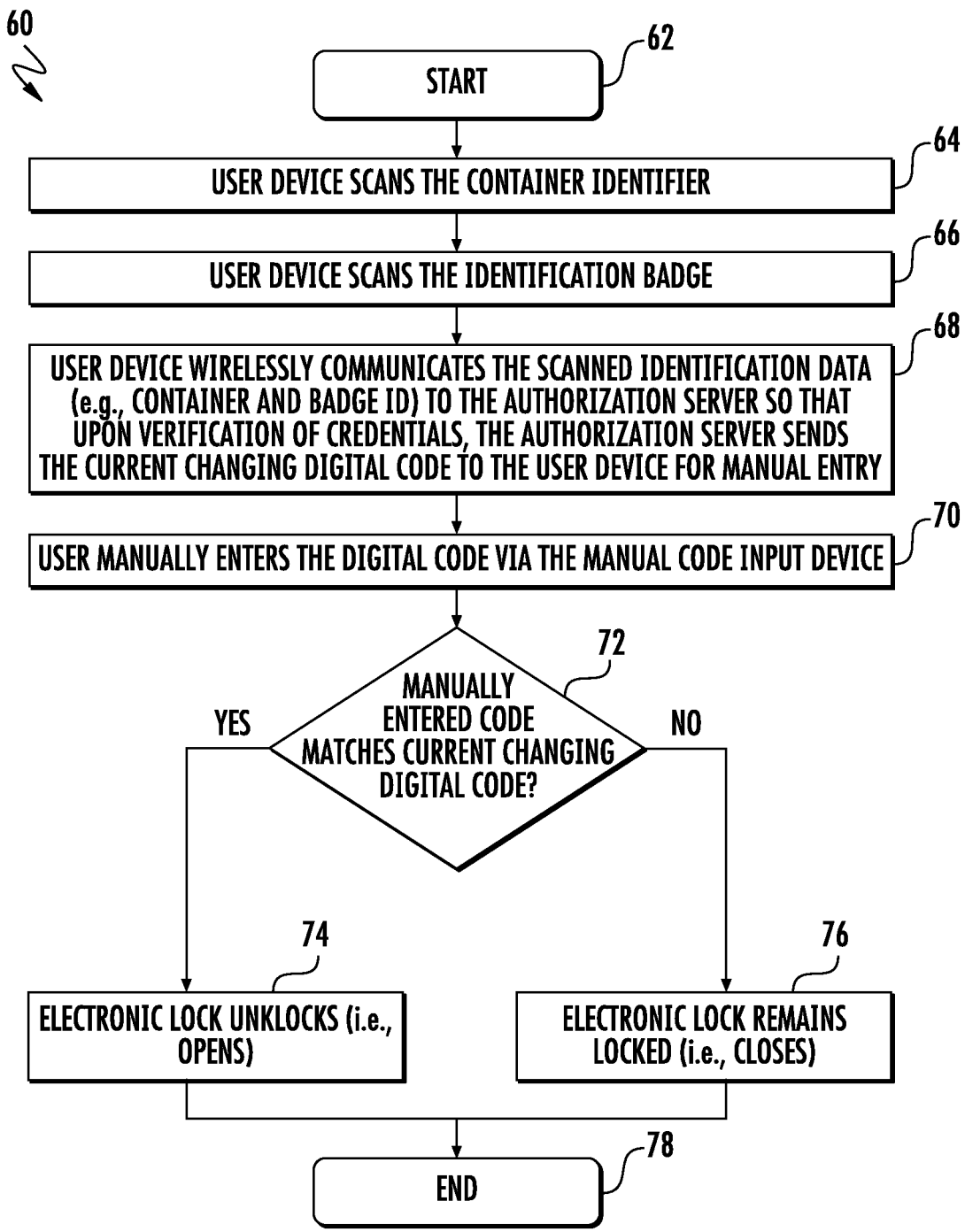
FIG. 5 is a flow chart illustrating an exemplary unlocking operation of the electronic lock of FIG. 1.

Referring now to FIG. 4 and the flowchart 60 in FIG. 5, beginning at Block 62, operation of the electronic lock 40 will now be described with respect to unlocking. At Block 64, a user device 55, for example, a mobile wireless communications device such as a smartphone or handheld device, may be used to scan (e.g., optically using a camera or optical scanner) the container identifier 25. An identification badge 26 of the user may also be scanned, for example, using the same device, for example, the user device 55 (Block 66). While the identification badge 26 illustratively includes a physical identifier, i.e., a barcode, those skilled in the art will appreciate that the identification badge may include an identifier that may be in the form of wireless codes or near field communication (NFC) codes, or other type of credential.

The user device 55 may wirelessly communicate the scanned identification data to the authorization server 50 so that upon verification of credentials, the authorization server 50 sends the current changing digital code 36 to user device 55 (Block 68) for manual entry. The user, at Block 70, manually enters the digital code via the manual code input device 44, which is matched against the current changing digital code 36 stored in the lock memory 42. Those skilled in the art will appreciate that, as a rolling code, the code provided by the authorization server 50 and the current changing digital code 36 are synchronized. If, at Block 72, the manually entered digital code matches the current changing digital code, the electronic lock opens or unlocks at Block 74 by way of operating the electromagnetic actuator 43, otherwise the electronic lock remains locked at Block 76. Operations end at Block 78.

Figure 6:
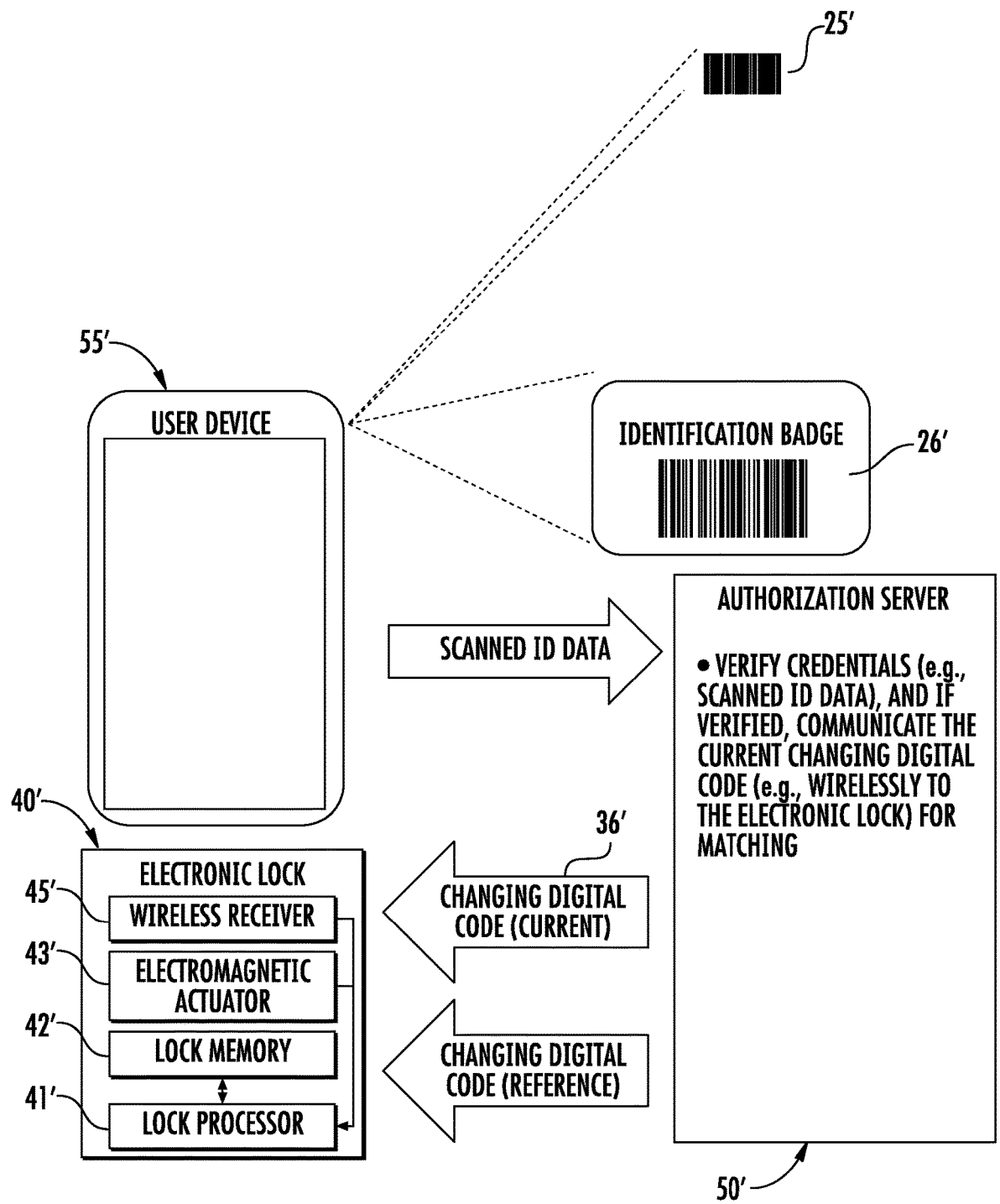
FIG. 6 is a schematic operational diagram illustrating unlocking of an electronic lock of a pharmaceutical transport system in accordance with another embodiment.
Figure 7:
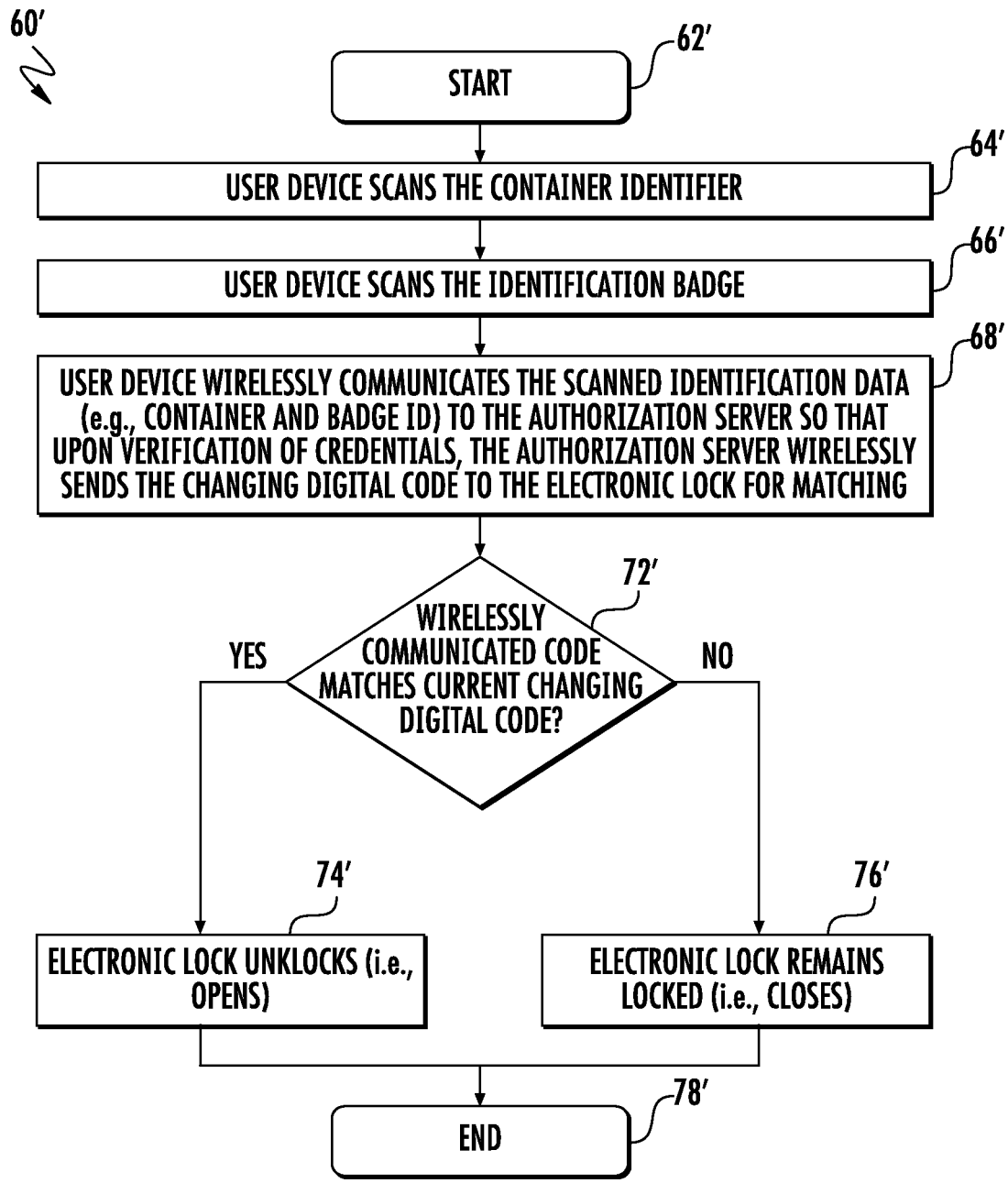
FIG. 7 is a flow chart illustrating an exemplary unlocking operation of the electronic lock of FIG. 6.

Referring now to FIG. 6, and the flowchart 60' in FIG. 7, beginning at Block 62', operation of an electronic lock 40' will now be described with respect to unlocking in accordance with another embodiment. At Block 64', a user device 55' may be used to scan the container identifier 25'. An identification badge 26' of the user may also be scanned, for example, using the same device, for example, the user device 55' (Block 66'). The user device 55' may wirelessly communicate the scanned identification data to the authorization server 50' so that upon verification of credentials, the authorization server wirelessly communicates the current changing digital code 36' to the electronic lock 40' for unlocking (Block 68'). In other words, the authorization server 50' communicates the digital code wirelessly to the electronic lock 40' for matching via the wireless receiver 45' so that the digital code is wirelessly entered (e.g., without manual entry) and is matched against the current changing digital code 36' stored in the lock memory 42'. If, at Block 72', the wirelessly entered digital code matches the current changing digital code 36', the electronic lock 40' opens or unlocks at Block 74' by way of operating the electromagnetic actuator 43', otherwise the electronic lock remains locked at Block 76'. The authorization server 50' may communicate the digital code for entry directly to the electronic lock 40' or by way of the user device 55' and/or other devices. Operations end at Block 78'.

Figure 8:
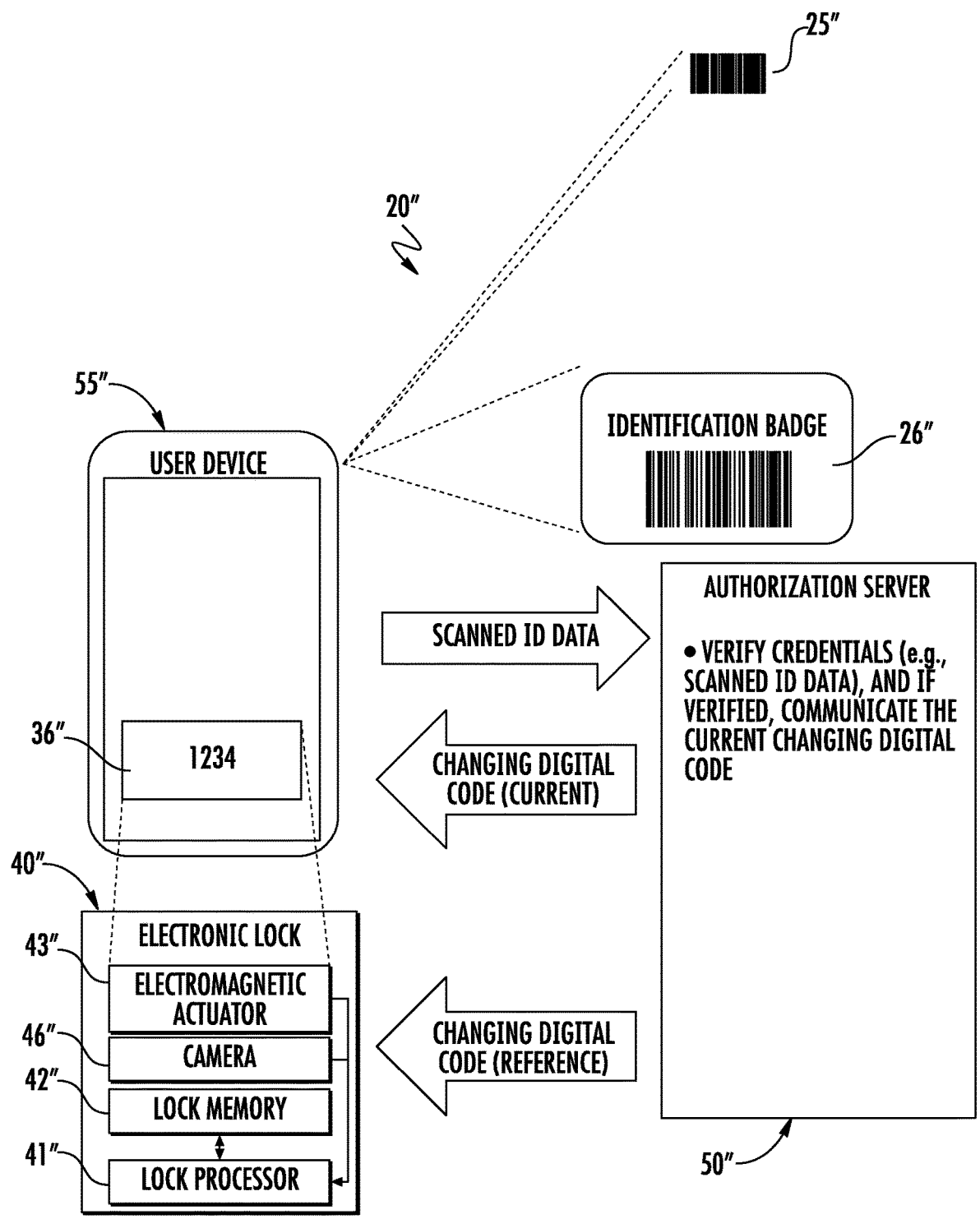
FIG. 8 is a schematic operational diagram illustrating unlocking of an electronic lock of a pharmaceutical transport system in accordance with another embodiment.
Figure 9:
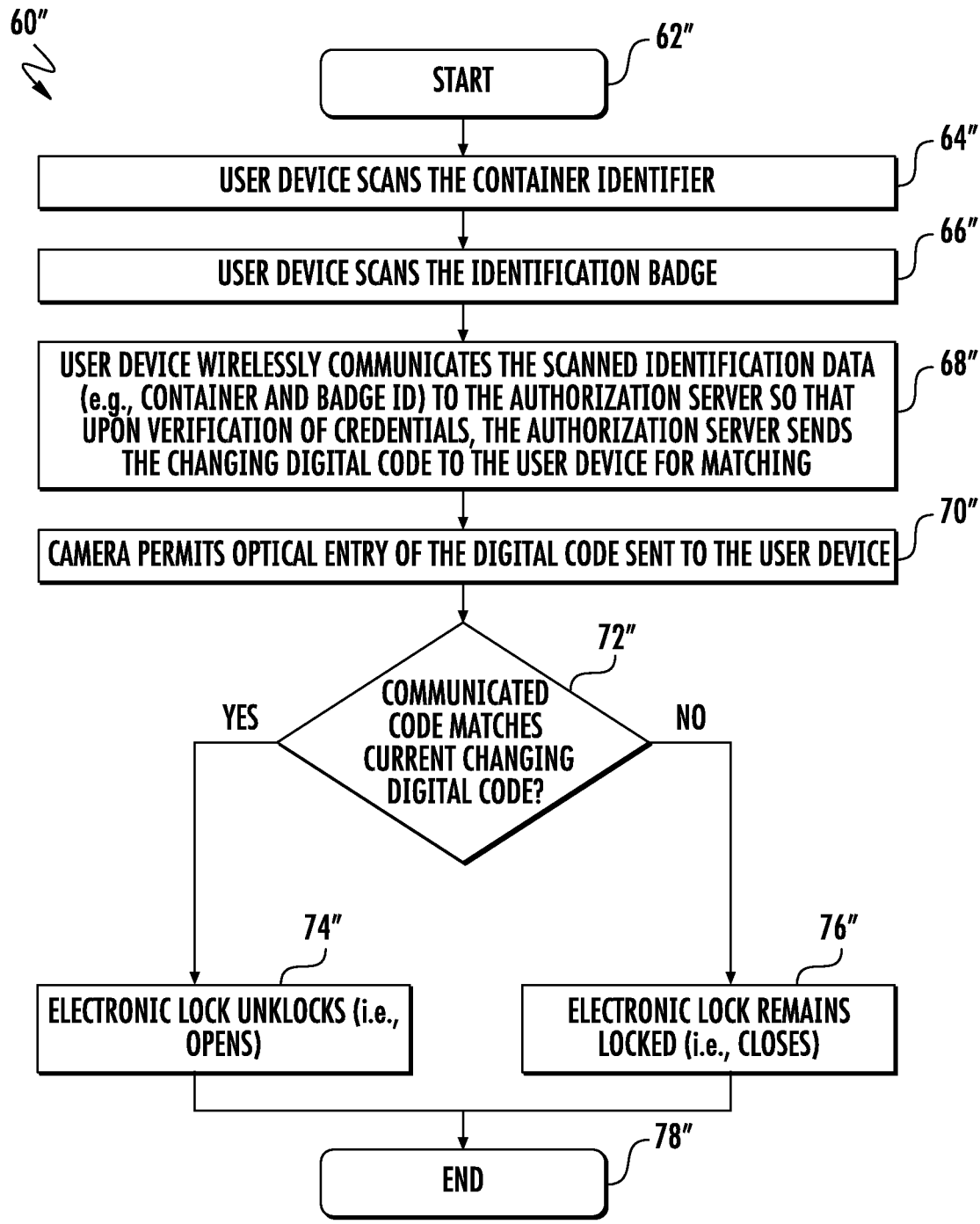
FIG. 9 is a flow chart illustrating an exemplary unlocking operation of the electronic lock of FIG. 8.

Referring now to FIG. 8 and the flowchart 60" in FIG. 9, beginning at Block 62", operation of the electronic lock 40" will now be described with respect to unlocking and in accordance with another embodiment. At Block 64", a user device 55", for example, a mobile wireless communications device such as a smartphone or handheld device, may be used to scan (e.g., optically using a camera or optical scanner) the container identifier 25". An identification badge 26" of the user may also be scanned, for example, using the same device, for example, the user device 55" (Block 66"). The user device 55" may wirelessly communicate the scanned identification data to the authorization server 50" so that upon verification of credentials, the authorization server sends the changing digital code 36" to user device 55"

(Block 68"). A camera 46" coupled to the lock processor 41" permits optical entry of the digital code, at Block 70". The current changing digital code 36", which may be in the form of a barcode, QR code, numerical code, alphabetical code, etc. may be displayed on a display of the user device 55" and scanned as the entered digital code. The scanned entered digital code is matched against the current changing digital code 36" stored in the lock memory 42" (Block 72"). If, at Block 72", the optically entered digital code matches the current changing digital code 36", the electronic lock 40" opens or unlocks at Block 74" by way of operating the electromagnetic actuator 43", otherwise the electronic lock remains locked at Block 76". Operations end at Block 78".

Figure 10:
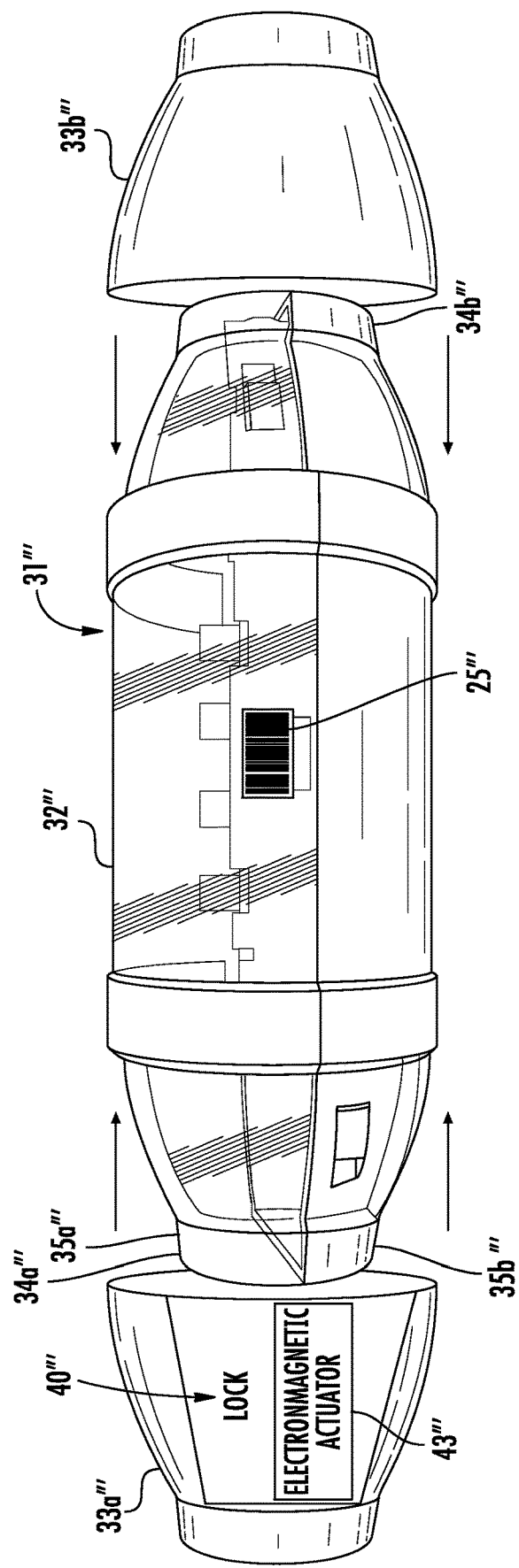
FIG. 10 is a schematic diagram of a pharmaceutical transport container in accordance with another embodiment.

Referring now to FIG. 10, in another embodiment, the tubular body 32''' includes a pair of mating container sections 35a''', 35b''', for example, in a clam-shell configuration and has a generally prolate spheroid shape (e.g., a football shape). End caps 33a''', 33b''' couple over respective ends 34a''', 34b''' of the tubular body 32'''. The electronic lock 40''' illustratively secures one of the end caps 33a''', 33b''' over the ends of the pair of mating container sections 35a''', 35b'''. The electromagnetic actuator 43''' may extend into or couple to the ends 34a''', 34b''' to secure the tubular container 31''' in the closed position. The electronic lock 40''', e.g., in the form of two physical electromagnetic actuators, may secure both ends caps 33a''', 33b''' to the respective ends.

While several different shapes and configurations of the tubular container 31 have been described herein, those skilled in the art will appreciate that other types of tubular containers, for example, having other shapes and sizes, may be used. Moreover, the lock 40 may be located elsewhere relative to the tubular body 32 and/or the end caps 33a, 33b, for example.

A method aspect is directed to a method of providing at least one pharmaceutical 27 in a pharmaceutical container 30 movable within a pneumatic tube network 21 of a pharmaceutical transport system 20. The method includes operating an electronic lock 40 securing a tubular container 32, having open and closed positions for receiving at least one pharmaceutical 27 therein, between the closed position and the open position based upon a match between an entered digital code and a current changing digital code 36.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

That which is claimed is:

1. A pharmaceutical transport system comprising:
   a pneumatic tube network;
   a pharmaceutical transport container movable within the pneumatic tube network and comprising
      a tubular container having open and closed positions for receiving at least one pharmaceutical therein, and
      an electronic lock securing the tubular container in the closed position and opening based upon determining a match between an entered digital code and a wirelessly received current pseudorandom digital code from among a sequence of pseudorandom digital codes; and
   an authorization server configured to psuedorandomly generate the sequence of pseudorandom digital codes and wirelessly transmit the current pseudorandom digital code to the electronic lock for determining the match between the entered digital code and the current pseudorandom digital code.

2. The pharmaceutical transport system of claim 1 wherein the electronic lock comprises a manual code input device to permit manual entry of the digital code.

3. The pharmaceutical transport system of claim 1 wherein the electronic lock comprises a wireless receiver to permit wireless entry of the digital code.

4. The pharmaceutical transport system of claim 1 wherein the electronic lock comprises a camera to permit optical entry of the digital code.

5. The pharmaceutical transport system of claim 1 wherein said authorization server is configured to send the current pseudorandom digital code to a user device.

6. The pharmaceutical transport system of claim 1 wherein the electronic lock comprises a processor and associated memory, and an electromechanical actuator coupled to the processor.

7. The pharmaceutical transport system of claim 1 wherein the tubular container comprises a tubular body, and a pair of movable end caps coupled to respective ends of the tubular body; and wherein the electronic lock secures at least one of the tubular end caps to the tubular body.

8. The pharmaceutical transport system of claim 1 wherein the tubular body comprises a pair of mating container sections.

9. A pharmaceutical container movable within a pneumatic tube network of a pharmaceutical transport system, the pharmaceutical container comprising:
   a tubular container having open and closed positions for receiving at least one pharmaceutical therein; and
   an electronic lock securing the tubular container in the closed position and opening based upon determining a match between an entered digital code and a wirelessly received current pseudorandom digital code from among a sequence of pseudorandom digital codes, and configured to receive each current pseudorandom digital code from an authorization server, the authorization server configured to psuedorandomly generate the sequence of pseudorandom digital codes and wirelessly transmit the current pseudorandom digital code to the electronic lock for determining the match between the entered digital code and the current pseudorandom digital code.

10. The pharmaceutical container of claim 9 wherein the electronic lock comprises a manual code input device to permit manual entry of the digital code.

11. The pharmaceutical container of claim 9 wherein the electronic lock comprises a wireless receiver to permit wireless entry of the digital code.

12. The pharmaceutical container of claim 9 wherein the electronic lock comprises a camera to permit optical entry of the digital code.

13. The pharmaceutical container of claim 9 wherein the electronic lock comprises a processor and associated memory, and an electromechanical actuator coupled to the processor.

14. The pharmaceutical container of claim 9 wherein the tubular container comprises a tubular body, and a pair of movable end caps coupled to respective ends of the tubular body; and wherein the electronic lock secures at least one of the tubular end caps to the tubular body.

15. The pharmaceutical container of claim 9 wherein the tubular body comprises a pair of mating container sections.

16. A method of providing at least one pharmaceutical in a pharmaceutical container movable within a pneumatic tube network of a pharmaceutical transport system, the method comprising:

operating an electronic lock securing a tubular container, having open and closed positions for receiving at least one pharmaceutical therein, between the closed position and the open position based upon determining a match between an entered digital code and a wirelessly received current pseudorandom digital code from among a sequence of pseudorandom digital codes from an authorization server, the authorization server configured to psuedorandomly generate the sequence of pseudorandom digital codes and wirelessly transmit the current pseudorandom digital code to the electronic lock for determining the match between the entered digital code and the current pseudorandom digital code.

17. The method of claim 16 wherein operating the electronic lock comprises operating a manual code input device to permit manual entry of the digital code.

18. The method of claim 16 wherein operating the electronic lock comprises operating a wireless receiver to permit wireless entry of the digital code.

19. The method of claim 16 wherein operating the electronic lock comprises operating a camera to permit optical entry of the digital code.

\* \* \* \* \*